United States Patent
Matsuzawa et al.

(10) Patent No.: US 8,717,703 B2
(45) Date of Patent: May 6, 2014

(54) MAGNETIC DISK DRIVE HAVING DUAL-STAGE ACTUATOR AND HEAD POSITION ESTIMATION METHOD FOR THE SAME

(75) Inventors: Takuji Matsuzawa, Kashiwa (JP); Susumu Yoshida, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 91 days.

(21) Appl. No.: 13/556,030

(22) Filed: Jul. 23, 2012

(65) Prior Publication Data

US 2013/0258520 A1 Oct. 3, 2013

(30) Foreign Application Priority Data

Mar. 30, 2012 (JP) ................. 2012-082413

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | | |
|---|---|---|---|---|
| 4,835,632 | A * | 5/1989 | Shih et al. ................... | 360/78.04 |
| 5,384,676 | A * | 1/1995 | Yokoyama et al. ........ | 360/77.13 |
| 6,483,659 | B1 | 11/2002 | Kobayashi et al. | |
| 2002/0101681 | A1 * | 8/2002 | He et al. ..................... | 360/78.05 |
| 2003/0235002 | A1 | 12/2003 | Takaishi | |
| 2004/0080862 | A1 * | 4/2004 | Miyata et al. .............. | 360/78.05 |
| 2004/0160698 | A1 * | 8/2004 | Zayas et al. ................ | 360/78.04 |
| 2013/0258520 | A1 * | 10/2013 | Matsuzawa et al. ........... | 360/75 |

FOREIGN PATENT DOCUMENTS

| | | |
|---|---|---|
| JP | 04-205864 | 7/1992 |
| JP | 2928631 | 5/1999 |
| JP | 2000-132929 | 5/2000 |
| JP | 2004-022133 | 1/2004 |
| JP | 3589876 | 8/2004 |
| JP | 2007-188630 | 7/2007 |
| JP | 4088108 | 2/2008 |

\* cited by examiner

*Primary Examiner* — Peter Vincent Agustin

(74) *Attorney, Agent, or Firm* — Knobbe, Martens, Olson & Bear LLP

(57) ABSTRACT

According to one embodiment, a magnetic disk drive includes a storage unit, a head position detector and a head position estimator. The head position detector detects a position of a first head if the first head is switched to a second head. The head position estimator estimates a position of the second head based on the position of the first head, first and second voltages, polarities of first and second microactuators, gains of the first and second microactuators, and a first inter-head offset. The first and second voltages are applied to the first and second microactuators, respectively. The first inter-head offset is stored in the storage unit.

14 Claims, 5 Drawing Sheets

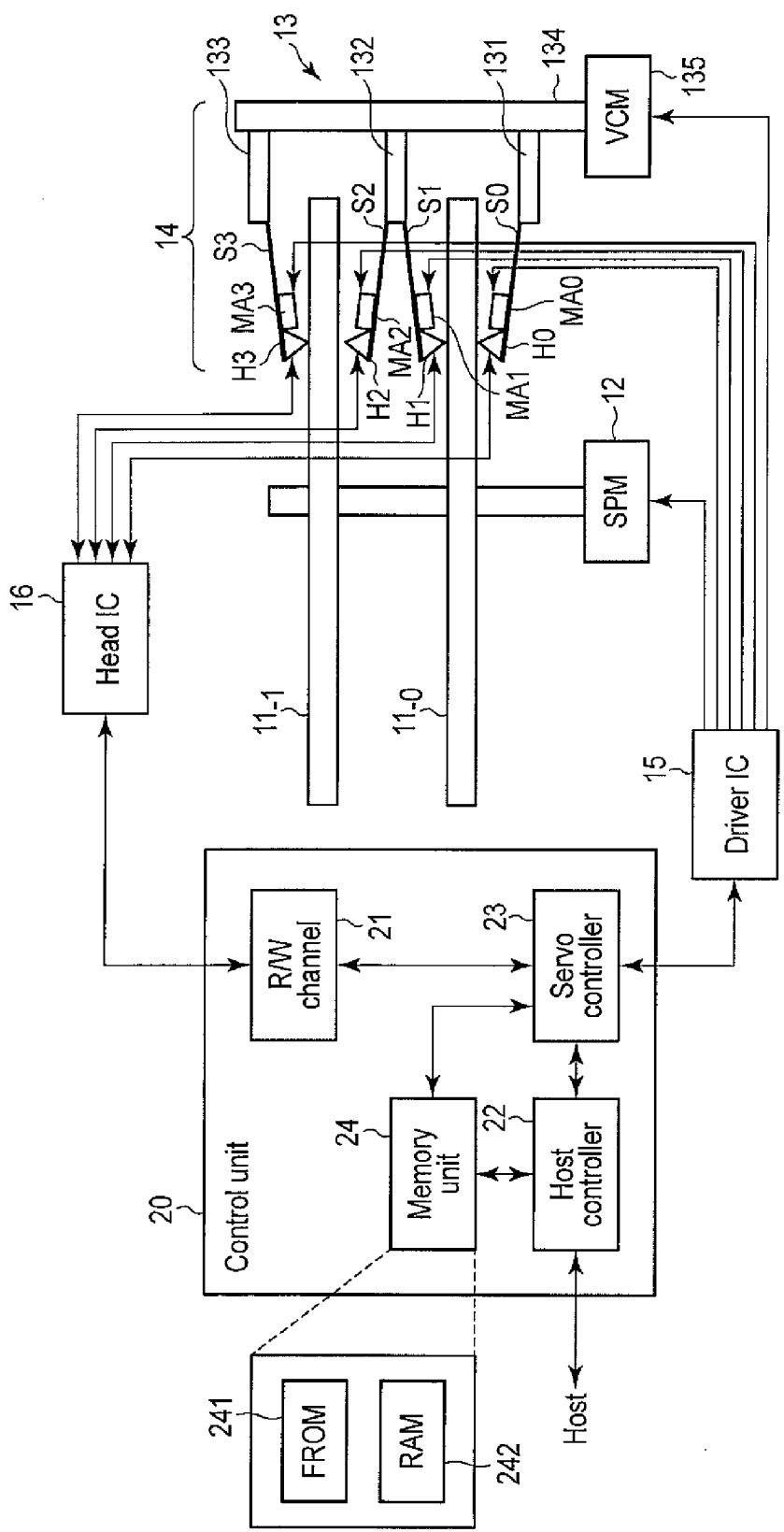
F I G. 1

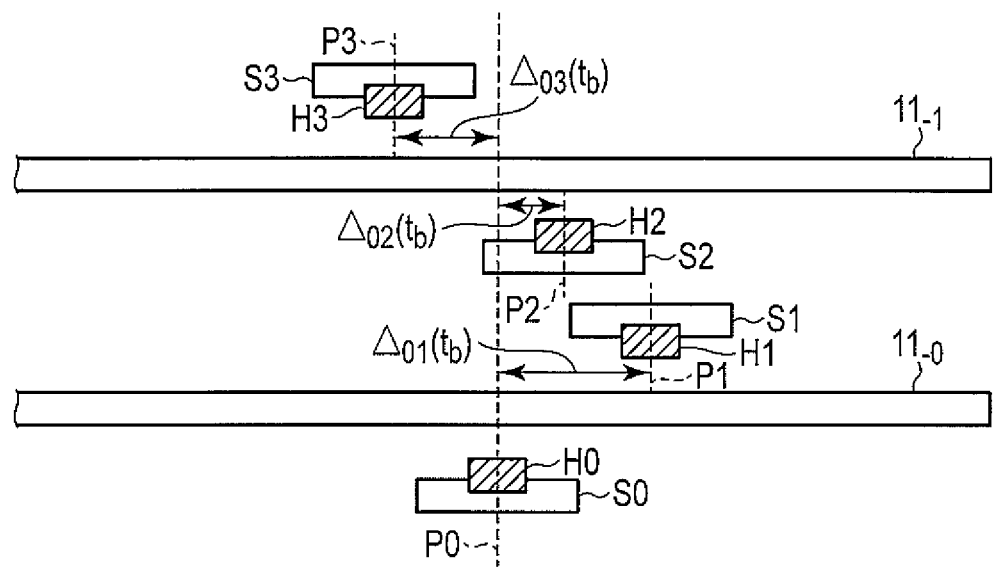
F I G. 2
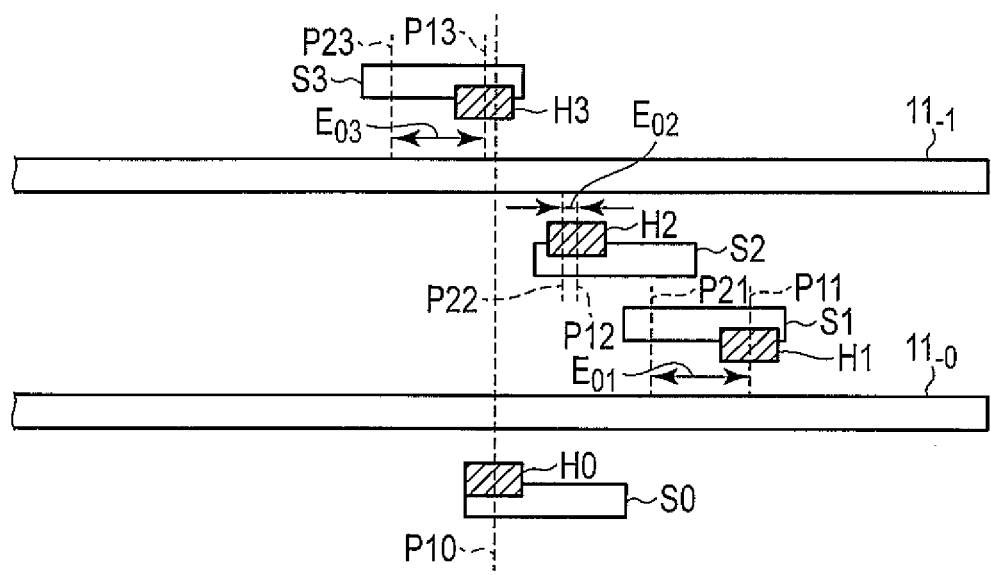
F I G. 3

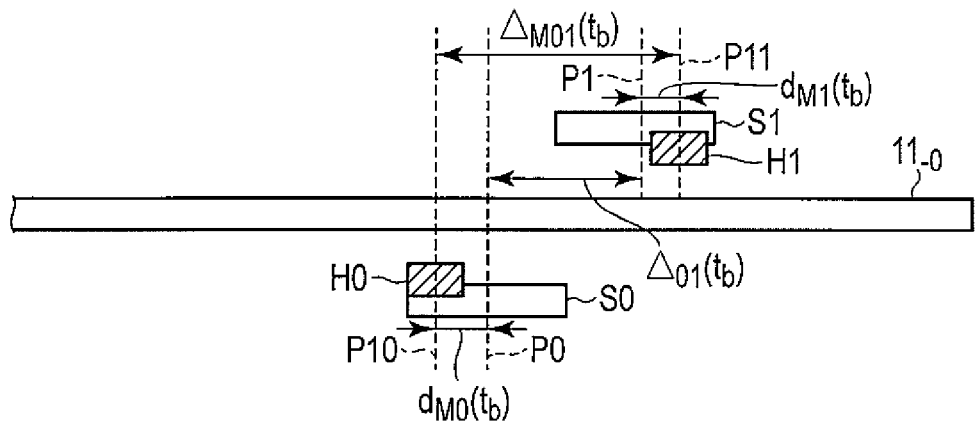
F I G. 4
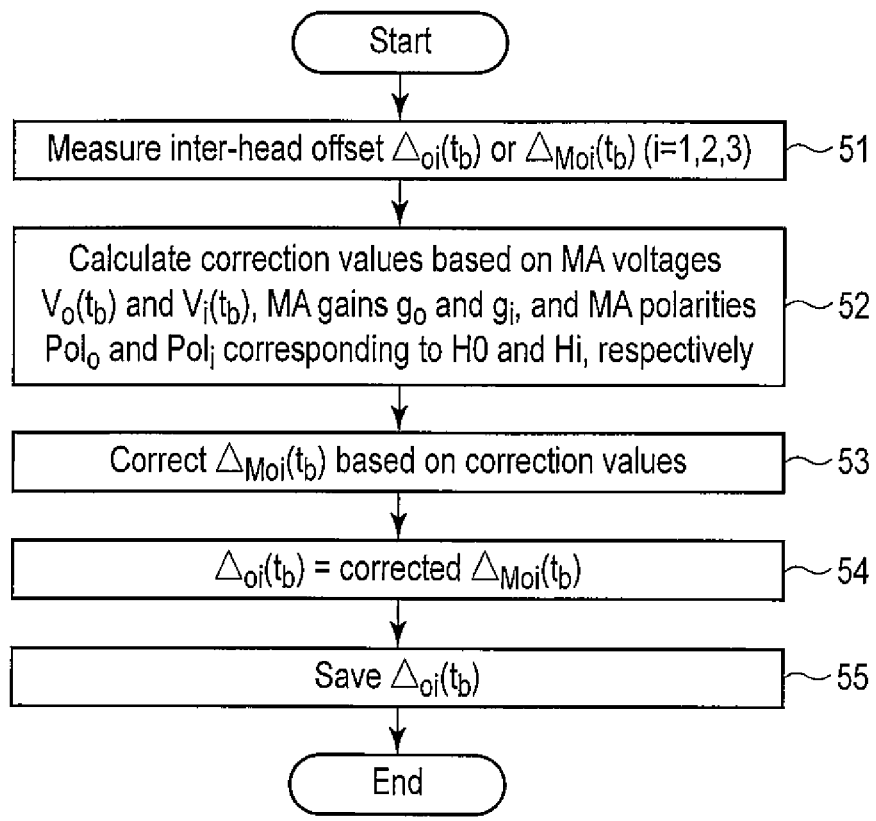
F I G. 5

US 8,717,703 B2

MAGNETIC DISK DRIVE HAVING DUAL-STAGE ACTUATOR AND HEAD POSITION ESTIMATION METHOD FOR THE SAME

CROSS-REFERENCE TO RELATED APPLICATIONS

This application is based upon and claims the benefit of priority from prior Japanese Patent Application No. 2012-082413, filed Mar. 30, 2012; the entire contents of which are incorporated herein by reference.

FIELD

Embodiments described herein relate generally to a magnetic disk drive having a dual-stage actuator and a head position estimation method for the magnetic disk drive.

BACKGROUND

In recent years, magnetic disk drives having dual-stage actuators (DSAs) have been developed. A dual-stage actuator comprises not only a voice coil motor (VCM) actuator but also at least one microactuator. Here, given a magnetic disk drive having a plurality of heads, a microactuator is provided in each of a plurality of suspensions that support the plurality of heads. The microactuator has a narrower range of motion than the VCM actuator but exhibits a high following capability at high frequency.

On the other hand, actuators that are currently in use comprise no microactuator. Such an actuator is referred to as a single-stage actuator (SSA).

As is well known, a plurality of heads are simultaneously moved in one direction by the VCM actuator. However, the relative positions of the plurality of heads in a radial direction of a disk are not necessarily the same because of variation in the mounting of the plurality of suspensions that support the plurality of heads. In the description below, the position of the head refers to the position in the radial direction of the disk.

For example, if the position of a first head is defined as a reference position, the position of a second head (relative position) is generally displaced from the reference position. Thus, if the switching (what is called head switching) from the first head to the second head takes place, the displacement affects a seek operation involving the head switching. The displacement is referred to as an inter-head offset.

Thus, the conventional art measures the offset between the first head and the second head. To switch from the first head to the second head, the conventional art estimates the position of the second head based on the result of the measurement and the position of the first head.

However, a magnetic disk drive having a dual-stage actuator may apply any voltage to each of a plurality of microactuators associated with a plurality of heads. The plurality of microactuators are displaced depending on the applied voltages, and the plurality of heads are also displaced according to the displacement of the microactuators. Furthermore, the plurality of microactuators individually vary in gain. Thus, even if the same voltage is applied to the plurality of microactuators, the displacements vary among the plurality of heads. Thus, there has been a demand for a magnetic disk drive having a dual-stage actuator which allows the head position to be corrected during head switching in view of the displacements of the heads resulting from the operation of the microactuators.

BRIEF DESCRIPTION OF THE DRAWINGS

FIG. 1 is a block diagram of an exemplary configuration of a magnetic disk drive according to an embodiment;

FIG. 2 is a diagram showing an example of inter-head offsets in a first state where microactuators shown in FIG. 1 are inactive;

FIG. 3 is a diagram showing an example of inter-head offsets in a second state where the microactuators are active;

FIG. 4 is a diagram for explaining a difference in inter-head offset between the first state and the second state;

FIG. 5 is a flowchart showing an exemplary procedure for a process of correcting an inter-head offset in the embodiment;

DETAILED DESCRIPTION

Figure 6:
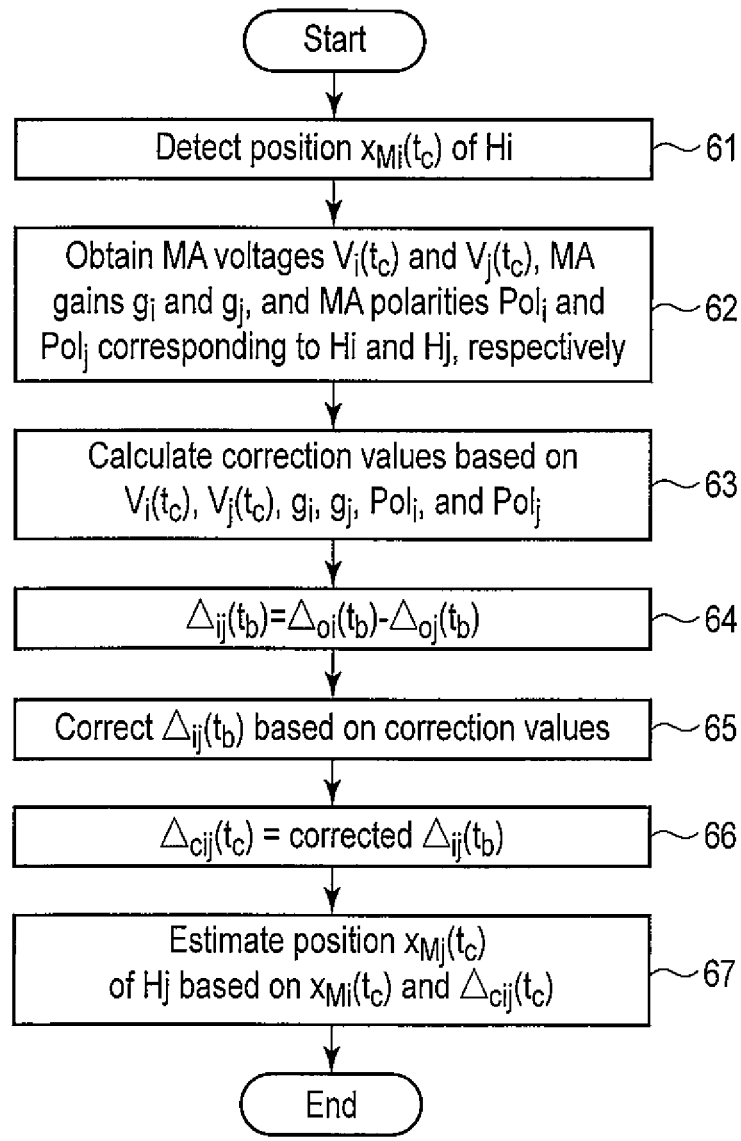
FIG. 6 is a flowchart showing an exemplary procedure for a process of estimating a head position utilizing an inter-head offset during head switching.

In general, according to one embodiment, a magnetic disk drive comprises a first microactuator, a second microactuator, a voice coil motor actuator, a storage unit, a head position detector and a head position estimator. The first microactuator is configured to cause fine movement of a first head associated with a first disk surface. The second microactuator is configured to cause fine movement of a second head associated with a second disk surface. The voice coil motor actuator is configured to cause coarse movement of the first head and the second head. The storage unit is configured to store a first inter-head offset measured in a first state at a first point of time. The first inter-head offset is indicative of a displacement between the first head and the second head in a radial direction of the first disk surface and the second disk surface. The first state comprises a state where the first microactuator and the second microactuator are kept stationary. The head position detector is configured to detect a position of the first head if the first head is switched to the second head at a second point of time subsequent to the first point of time. The head position estimator is configured to estimate a position of the second head based on the position of the first head, a first voltage, a first polarity of the first microactuator, a first gain of the first microactuator, a second voltage, a second polarity of the second microactuator, a second gain of the second microactuator, and the first inter-head offset. The first voltage and the second voltage are applied to the first microactuator and the second microactuator, respectively, at the second point of time.

FIG. 1 is a block diagram of an exemplary configuration of a magnetic disk drive according to an embodiment. The magnetic disk drive shown in FIG. 1 comprises at least one disk (magnetic disk), for example, two disks $11_{-0}$ and $11_{-1}$, a plurality of heads (magnetic heads), for example, four heads H0 to H3, a spindle motor (SPM) 12, and a voice coil motor (VCM) actuator 13.

Disks $11_{-0}$ and $11_{-1}$ are magnetic recording media arranged with a given distance maintained between the disks. A top surface (that is, an upper disk surface) and a bottom surface (that is, a lower disk surface) of each of disks $11_{-0}$ and $11_{-1}$ form recording surfaces on which data is magnetically recorded. Disks $11_{-0}$ and $11_{-1}$ are rotated at high speed by the SPM 12. The SPM 12 is driven by, for example, a driving current supplied by a driver IC 15 described below.

Heads H0 and H1 are arranged in association with the bottom and top surfaces, respectively, of disk $11_{-0}$. Heads H2 and H3 are arranged in association with the bottom and top surfaces, respectively, of disk $11_{-1}$. Each of heads H0 to H3 comprises a read element and a write element (neither of the elements is shown in the drawings). Heads H0 and H1 are used to write data to the bottom and top surfaces, respectively, of disk $11_{-0}$ and to read data from the bottom and top surfaces, respectively, of disk $11_{-0}$. Heads H2 and H3 are used to write data to the bottom and top surfaces, respectively, of disk $11_{-1}$ and to read data from the bottom and top surfaces, respectively, of disk $11_{-1}$.

The configuration in FIG. 1 assumes the magnetic disk drive comprising the two disks $11_{-0}$ and $11_{-1}$. However, the magnetic disk drive may comprise a single disk or more than two stacked disks.

The VCM actuator 13 comprises, for example, three arms 131, 132, and 133. Head H0 is attached to a tip of suspension S0 extending from the arm 131 of the VCM actuator 13 (more specifically, to a head slider provided at the tip of suspension S0). Heads H1 and H2 are attached to tips of suspensions S1 and S2 extending from the arm 132 of the VCM actuator 13. Head H3 is attached to a tip of suspension S3 extending from the arm 133 of the VCM actuator 13.

The arms 131 to 133 of the VCM actuator 13 are pivotally movably supported around a pivot 134. The VCM actuator 13 comprises a VCM 135. The VCM 135 is a driving source for the VCM actuator 13. The VCM 135 is driven in accordance with a driving current supplied by a driver IC 15 to pivotally move the arms 131 to 133 of the VCM actuator 13 around the pivot 134 at the same time. That is, the VCM 135 causes coarse movement of the arms 131 to 133 in a radial direction of disks $11_{-0}$ and $11_{-1}$. This causes the coarse movement of heads H0 to H3 in the radial direction of disks $11_{-0}$ and $11_{-1}$ so as to draw an arc.

Microactuators MA0 to MA3 are further attached to suspensions S0 to S3, respectively. Thus, the magnetic disk drive shown in FIG. 1 comprises a dual-stage actuator 14 having the VCM actuator 13 and microactuators MA0 to MA3. Microactuators MA0 to MA3 are driven in accordance with a driving voltage applied by a driver IC 15. Microactuators MA0 to MA3 thus cause fine movement of heads H0 to H3.

The magnetic disk drive shown in FIG. 1 further comprises the driver IC 15, a head IC 16, and a control unit 20. The driver IC 15 drives the SPM 12, VCM 135 (VCM actuator 13), and microactuators MA0 to MA3 in accordance with control performed by the control unit 20 (more specifically, a servo controller 23 in the control unit 20, which will be described below).

The head IC 16 is referred to as a head amplifier, and amplifies a signal read by a selected single one of heads H0 to H3 (that is, a single read signal). The head IC 16 also converts write data output by the control unit 20 (more specifically, an R/W channel 21 in the control unit 20, which will be described below) into a write current, and outputs the write current to the selected single head.

The control unit 20 is implemented by a system LSI having a plurality of elements integrated on a single chip. The control unit 20 comprises a read/write (R/W) channel 21, a host controller 22, a servo controller 23, and a memory unit 24. In FIG. 1, for simplification, a disk controller commonly provided in the control unit 20 is omitted. The disk controller controls data writes to disks $11_{-0}$ and $11_{-1}$ and data reads from disks $11_{-0}$ and $11_{-1}$.

The R/W channel 21 processes signals for reads and writes. That is, the R/W channel 21 converts the single read signal amplified by the head IC 16 into digital data, and decodes read data from the digital data. The R/W channel 21 also encodes write data transferred by the disk controller, and transfers the encoded write data to the head IC 16.

The host controller 22 transmits signals to a host (host device) via an external interface (storage interface) and receives signals from the host via the external interface. Specifically, the host controller 22 receives commands transferred by the host via the external interface (a write command, a read command, and the like). The host controller 22 also controls the data transfer between the host and the host controller 22. The host utilizes the magnetic disk drive shown in FIG. 1 as the host's own storage device. The host and the magnetic disk drive shown in FIG. 1 are provided in electronic device such as a personal computer, a video camera, a music player, a portable terminal, a cellular phone, or a printer.

The servo controller 23 controls the VCM 135 via the driver IC 15 for coarse adjustment during positioning of a selected one of heads H0 to H3 at a target position on the corresponding disk. Here, controlling the VCM 135 is equivalent to controlling the VCM actuator 13 having the VCM 135. Moreover, in order to allow fine adjustment of the position of the selected head, the servo controller 23 controls the corresponding microactuator via the driver IC 15. Furthermore, the servo controller 23 controls a seek operation for moving the selected head to a target track by using both the VCM actuator 13 and the microactuators.

In the embodiment, each of the host controller 22 and the servo controller 23 comprises a microprocessor unit (MPU). MPUs implement the functions of the host controller 22 and the servo controller 23 by executing respective control programs for the host controller 21 and the servo controller 22. The control programs are stored in a FROM 241 described below. Respective control programs for the host controller 22 and the servo controller 23 are executed to implement the functions of the host controller 22 and the servo controller 23. A single MPU may execute the respective control programs for the host controller 22 and the servo controller 23 in a time-sharing manner.

The memory unit 24 comprises a flash ROM (FROM) 241 and a RAM 242. The FROM 241 is a rewritable nonvolatile memory. The control programs (firmware) for implementing the functions of the control unit 20 including the host controller 22 and the servo controller 23 are pre-stored in a part of a storage area of the FROM 241.

Another part of the storage area of the FROM 241 is used to save an inter-head offset $\Delta_{0i}(t_b)$ (i=1, 2, 3). The inter-head offset $\Delta_{0i}(t_b)$ represents the displacement of head H1 from head H0 in the radial direction of the disk which is measured at a time tb. However, if the inter-head offset is measured in a state (second state) where microactuators MA0 and MA1 are active, the measured inter-head offset is corrected to an inter-head offset caused in a state (first state) where the microactuators MA0 and MA1 are inactive. The corrected inter-head offset is used as $\Delta_{0i}(t_b)$. At least a part of the storage area of the RAM 242 is used as a work area for the host controller 22 and the servo controller 23.

Now, the measurement of the inter-head offset according to the embodiment will be described. In the description below, the position of the head refers to the position in the radial direction of the disk. In the magnetic disk drive, avoiding the inter-head offset caused by a variation in the mounting of the suspensions is difficult. For example, if an offset is present between the position of the first head and the position of the second head, a seek time required for a seek operation involving switching from the first head to the second head varies or increases. Thus, the conventional art measures the inter-head offset in order to reduce the variation in the seek time or to shorten the seek time. To switch from the first head to the second head, the conventional art estimates the position of the second head based on the result of the measurement and the position of the first head.

The magnetic disk drive shown in FIG. 1 comprises the dual-stage actuator 14 as described above. The dual-stage actuator 14 comprises microactuators MA0 to MA3 associated with heads H0 to H3, respectively. In such a magnetic disk drive, the inter-head offset constantly varies. This reduces the accuracy of estimation of the head position during head switching.

FIG. 2 shows an example of inter-head offsets in the first state where microactuators MA0 to MA3 shown in FIG. 1 are inactive, and schematically represents the microscopic positional relationships between the head and microactuators MA0 to MA3 in the radial direction of disk 11. In FIG. 2, P0 to P3 denote the positions of heads H0 to H3 (more specifically, the positions of centers of heads H0 to H3 in the radial direction of the disk) at time $t_b$. $\Delta_{01}(t_b)$, $\Delta_{02}(t_b)$, and $\Delta_{03}(t_b)$ denote the offsets of the positions P1, P2, and P3 of heads H1, H2, and H3 from the position P0 of head H0 (that is, the inter-head offsets).

Here, it is assumed that microactuators MA0 to MA3 are inactive. In this case, the servo controller 23 can accurately estimate the position of head Hi (i=1, 2, 3) positioned at time $t_c$ ($t_c$>$t_b$) when head H0 is switched to head Hi, based on the inter-head offset $\Delta_{0i}(t_b)$ and the current position of head H0. However, in general, microactuators MA0 to MA3 are actually in operation.

FIG. 3 shows an example of the inter-head offsets in the second state where microactuators MA0 to MA3 are active. In FIG. 3, P10 to P13 denote the positions of head H1 to H3 at time $t_b$. In FIG. 3, the inter-head offsets of heads H1 to H3 from head H0 are distances P10P11 to P10P13 between P10 and P11 to P13. Compared to the inter-head offsets $\Delta_{01}(t_b)$ to $\Delta_{03}(t_b)$ in the first state, the inter-head offsets P10P11 to P10P13 include errors $E_{01}$ to $E_{03}$. The errors $E_{01}$ to $E_{03}$ correspond to a displacement of head H0 caused by motion of microactuator MA0 (that is, the displacement of the microactuator MA0) and displacements of heads H1 to H3 caused by motion of microactuators MA1 to MA3 (that is, the displacements of the microactuators MA1 to MA3). The errors E01 to E03, which relate to heads H1 to H3, are distances P21P11 to P23P13 between the positions P11 to P13 of heads H1 to H3 and positions P21 to P23. The positions P21 to P23 are obtained by adding the inter-head offsets $\Delta_{01}(t_b)$ to $_{03}(t_b)$ in the first state to the position P10 of head H0. The inter-head offset P10P1i (i=1, 2, 3) corresponds to an inter-head offset $\Delta_{M0i}(t_b)$ described below.

Methods 1 to 3 described below are known to move microactuators MA0 to MA3 of the dual-stage actuator 14 by applying a voltage to microactuators MA0 to MA3. The method 1 moves microactuators MA0 to MA3 independently by applying voltages independently to all microactuators MA0 to MA3. The method 2 divides heads H0 to H3 into two groups, and sets the polarities of microactuators MA0 to MA3 corresponding to heads H1 to H3 so that the microactuators in one group have a polarity opposite to that of the microactuators in the other group. According to the method 2, when the same voltage is applied to all microactuators MA0 to MA3, the microactuators in one group move in a direction opposite to that in which the microactuators in the other group move. The method 3 moves all microactuators MA0 to MA3 in the same direction by applying the same voltage to microactuators MA0 to MA3.

Now, the method 2 will be described in detail. The method 2 is applied to reduce excitation of resonance of the arms caused by driving of microactuators MA0 to MA3. For example, in FIG. 1, heads H1 and H2 attached to suspensions S1 and S2 extending from the same arm 132 are classified into different groups. Here, it is assumed that heads H0 and H2 corresponding to the bottom surfaces of disks $11_{-0}$ and $11_{-1}$ are classified as a group A and that heads H1 and H3 corresponding to the top surfaces of disks $11_{-0}$ and $11_{-1}$ are classified as a group B. In this case, heads H0 and H2 in the group A are moved in a direction opposite to that in which heads H1 and H3 in the group B are moved. Thus, when the head in group A are switched to the head in the group B, the inter-head offset measured in the first state or the second state includes an error corresponding to the displacement of the microactuators.

Furthermore, the gains (hereinafter referred to as MA gains) $g_0$ to $g_3$ of microactuators MA0 to MA3 generally vary. A variation in MA gain generally varies the displacements between microactuators MA0 to MA3. Thus, even if head switching occurs within the same group, the measured inter-head offset includes an error.

When the inter-head offset includes the error corresponding to the displacement of each of the microactuators, the position of head H1 estimated in, for example, a seek operation involving switching from head H0 to head H1 is different from the actual position. In this case, a seek distance may be erroneously determined to delay the seek operation.

FIG. 4 shows the difference in inter-head offset between the first state and the second state, taking the inter-head offset of head H1 from head H0 as an example. In FIG. 4, P0 and P1 denote the positions of heads H0 and H1 in the first state as is the case with FIG. 2. P10 and P11 denote the positions of heads H0 and H1 in the second state as is the case with FIG. 3.

At time $t_b$, if microactuators MA0 and MA1 are in the first state, heads H0 and H1 are positioned at P0 and P1, respectively. In this case, the offset $\Delta_{01}(t_b)$ of head H1 from head H0 corresponds to the distance P0P1 between P0 and P1.

In contrast, it is assumed that at time $t_b$, microactuators MA0 to MA3 are in the second state and that heads H0 and H1 have been displaced from P0 and P1 by $d_{M0}(t_b)$ and $d_{M1}(t_b)$, respectively. In this state, heads H0 and H1 are positioned at P10 and P11. In this case, unlike the offset $\Delta_{01}(t_b)$, the offset $\Delta_{M01}(t_b)$ of head H1 from head H0 generally corresponds to the distance P10P11 between P10 and P11. Moreover, unlike $\Delta_{01}(t_b)$, $\Delta_{M01}(t_b)$ varies depending on time $t_b$. The same applies to the offsets of heads H2 and H3 from head H0.

Thus, the inter-head offset varies depending on the state of each of microactuators MA0 to MA3. This leads to the need to determine the inter-head offset in view of the displacements of heads H0 to H3 caused by the operation (displacement) of microactuators MA0 to MA3 and to correct the head position during head switching.

Taking the case of application of the method 1 as an example, the following will be described: a process of correcting the inter-head offset with the effects of displacements of microactuators MA0 to MA3 taken into account and a process of estimating the head position utilizing the inter-head offset. First, an exemplary procedure for the process of correcting the inter-head offset will be described with reference to a flowchart in FIG. 5.

The servo controller 23 functions as an inter-head offset measurement module at time $t_b$. Then, the servo controller 23 measures the offset $\Delta_{0i}(t_b)$ or $\Delta_{M0i}(t_b)$ of head Hi (i=1, 2, 3) from head H0 (that is, the inter-head offset) using the position of head H0 as a reference position (block 51). The block 51 varies between a first case where microactuators MA0 to MA3 are allowed to be kept stationary, for example, as in the case where the magnetic disk drive in FIG. 1 has not been shipped yet, and a second case where microactuators MA0 to MA3 need to be moved as in the case where the magnetic disk drive has been shipped.

In the first case, with microactuators MA0 to MA3 kept stationary (that is, in the first state), the servo controller 23 measures the inter-head offset $\Delta_{0i}(t_b)$ for all values of i (i=1, 2, 3) as follows. First, at time $t_b$, the servo controller 23 detects the position $x_0(t_b)$ of reference head H0 and the position $x_i(t_b)$ of another head Hi. As is well known, the positions $x_0(t_b)$ and $x_i(t_b)$ are detected based on servo data extracted by the R/W channel 21 from signals sequentially read by heads H0 and Hi through head switching performed by the head IC 16.

Then, the servo controller 23 calculates the inter-head offset $\Delta_{0i}(t_b)$, the difference between the position $x_0(t_b)$ of the reference head H0 and the position $x_i(t_b)$ of another head Hi, for all values of i, in accordance with:

$$\Delta_{0i}(t_b) = x_i(t_b) - x_0(t_b) \tag{1}$$

That is, the servo controller 23 measures the inter-head offset $\Delta_{0i}(t_b)$ for all values of i. In this case, the servo controller 23 saves the measured inter-head offset $\Delta_{0i}(t_b)$ to the FROM 241 (block 55).

In contrast, in the second case, with microactuators MA0 to MA3 active (that is, in the second state), the servo controller 23 measures the inter-head offset $\Delta_{M0i}(t_b)$ for all values of i (i=1, 2, 3) as follows. First, at time $t_b$, the servo controller 23 detects the position $x_{M0}(t_b)$ of the reference head H0 and the position $x_{Mi}(t_b)$ of another head Hi.

Then, the servo controller 23 calculates the inter-head offset $\Delta_{M0i}(t_b)$, the difference between the position $x_{M0}(t_b)$ of the reference head H0 and the position $x_{Mi}(t_b)$ of another head Hi, for all values of i, in accordance with:

$$\Delta_{M0i}(t_b) = x_{Mi}(t_b) - x_{M0}(t_b) \tag{2}$$

The servo controller 23 temporarily stores the calculated inter-head offset $\Delta_{M0i}(t_b)$ in the RAM 242.

$x_{Mi}(t_b)$ and $x_{M0}(t_b)$ are respectively expressed by:

$$x_{Mi}(t_b) = x_i(t_b) + pol_i \times d_{Mi}(t_b) \tag{3}$$

$$x_{M0}(t_b) = x_0(t_b) + pol_0 \times d_{M0}(t_b) \tag{4}$$

where $x_i(t_b)$, $pol_i$ and $d_{Mi}(t_b)$ denote the position of head Hi detected when the displacement of microactuator MAi is 0, the polarity of microactuator MAi (that is, the MA polarity), and the displacement of microactuator MAi caused at time $t_b$. Similarly, $x_0(t_b)$, $pol_0$ and $d_{M0}(t_b)$ denote the position of head H0 detected when the displacement of microactuator MA0 is 0, the polarity of microactuator MA0, and the displacement of microactuator MA0 caused at time $t_b$. In the embodiment, the positive MA polarity is expressed as 1, and the negative MA polarity is expressed as −1.

Upon executing block 51, the servo controller 23 functions an inter-head offset correction module and executes blocks 52 to 55 described below. First, the servo controller 23 calculates correction values $pol_i \times d_{Mi}(t_b)$ and $pol_0 \times d_{M0}(t_b)$ based on MA voltages $V_i(t_b)$ and $V_i(t_b)$, MA gains $g_i$ and $g_0$, and the MA polarities $pol_i$ and $pol_0$, which correspond to heads Hi and H0, respectively (block 52). Here, the MA voltages $V_i(t_b)$ and $V_0(t_b)$ are driving voltages measured at time $t_b$ (that is, the measurement time $t_b$) and applied to microactuators MAi and MA0 by the driver IC 15 in accordance with an instruction from the servo controller 23. The MA gains $g_i$ and $g_0$ are indicative of the displacements of microactuators MAi and MA0 caused in a case where the driving voltage applied to microactuators MAi and MA0 is a reference voltage (for example, 1V). The MA gains $g_i$ and $g_0$ can be pre-obtained by detecting the positions of heads Hi and H0 before and after the driver IC 15 applies the reference voltage to microactuators MAi and MA0 in accordance with an instruction from the servo controller 23.

The block 52 will be described in detail. The respective displacements $d_{Mi}(t_b)$ and $d_{M0}(t_b)$ of microactuators MAi and MA0 are expressed by:

$$d_{Mi}(t_b) = g_i \times V_i(t_b) \tag{5}$$

$$d_{M0}(t_b) = g_0 \times V_0(t_b) \tag{6}$$

Thus, the servo controller 23 calculates the correction values $pol_i \times d_{Mi}(t_b)$ and $pol_0 \times d_{M0}(t_b)$ in accordance with:

$$pol_i \times d_{Mi}(t_b) = pol_i \times g_i \times V_i(t_b) \tag{7}$$

$$pol_0 \times d_{M0}(t_b) = pol_0 \times g_0 \times V_0(t_b) \tag{8}$$

Then, the servo controller 23 corrects the inter-head offset $\Delta_{M0i}(t_b)$ stored in the RAM 242, that is, the inter-head offset $\Delta_{M0i}(t_b)$ in the second state, to the inter-head offset in the first state based on the correction values $pol_i \times d_{Mi}(t_b)$ and $pol_0 \times d_{M0}(t_b)$ calculated in block 52 (block 53). The details of the correction are as follows.

First, based on Expressions (2) to (4) shown above, the inter-head offset $\Delta_{M0i}(t_b)$ in the second state is expressed by:

$$\Delta_{M0i}(t_b) = x_{Mi}(t_b) - x_{M0}(t_b) \tag{9}$$
$$= (x_i(t_b) + pol_i \times d_{Mi}(t_b)) - (x_0(t_b) + pol_0 \times d_{M0}(t_b))$$

Based on Expression (9), the inter-head offset $x_i(t_b) - x_0(t_b)$ in the first state is expressed by:

$$x_i(t_b) - x_0(t_b) = \Delta_{M0i}(t_b) - pol_i \times d_{Mi}(t_b) + pol_0 \times d_{M0}(t_b) \tag{10}$$

Thus, the servo controller 23 corrects $\Delta_{M0i}(t_b)$ to $x_i(t_b) - x_0(t_b)$ in accordance with Expression (10). The servo controller 23 sets the corrected $\Delta_{M0i}(t_b)$ (=$x_i(t_b) - x_0(t_b)$) as the inter-head offset $\Delta_{0i}(t_b)$ in the first state (block 54). Then, the servo controller 23 saves the inter-head offset $\Delta_{0i}(t_b)$ to the FROM 241 (block 55). The inter-head offset $\Delta_{0i}(t_b)$ is free from the effects of displacements of microactuators MA0 and MAi.

Here, it is assumed that the inter-head offset in the first case $\Delta_{0i}(t_a) = x_i(t_a) - x_0(t_a)$ is measured at time $t_a$ preceding time $t_b$ ($t_a < t_b$). In this case, the servo controller 23 may calculate the difference $d\Delta_{0i}(t_b)$ between $\Delta_{0i}(t_b)$ (that is, the corrected inter-head offset $\Delta_{M0i}(t_b)$) and $\Delta_{0i}(t_a)$ in accordance with:

$$d\Delta_{0i}(t_b) = \Delta_{0i}(t_b) - \Delta_{0i}(t_a) \tag{11}$$
$$= (x_i(t_b) - x_0(t_b)) - (x_i(t_a) - x_0(t_a))$$

The servo controller 23 may save both $\Delta_{0i}(t_a)$ and $d\Delta_{0i}(t_b)$ to the FROM 241 instead of $\Delta_{0i}(t_b)$.

Now, an exemplary procedure for the process of estimating the head position utilizing the inter-head offset during head switching will be described with reference to a flowchart in FIG. 6. First, it is assumed head Hi is switched to head Hj (j≠i) at time $t_c$ ($t_c > t_b$). Then, the servo controller 23 functions as a head position detector, and detects the position $x_{Mi}(t_c)$ of head Hi (block 61). Here, i denotes one of 0, 1, 2, and 3 unlike in the case of the process of correcting the inter-head offset.

Then, the servo controller 23 functions as a head position estimator, and executes blocks 62 to 67 described below. First, the servo controller 23 obtains MA voltages $V_i(t_c)$ and $V_j(t_c)$, MA gains $g_i$ and $g_j$ and MA polarities $pol_i$ and $pol_j$, which correspond to heads Hi and Hj, respectively (block 62). Then, the servo controller 23 calculates correction values $pol_i \times d_{Mi}(t_c) = pol_i \times g_i \times V_i(t_c)$ and $pol_j \times d_{Mj}(t_c) = pol_j \times g_j \times V_j(t_c)$ for the displacements $d_{Mi}(t_c)$ and $d_{Mj}(t_c)$ of microactuators MAi and MAj based on the MA voltages $V_i(t_c)$ and $V_j(t_c)$, the MA gains $g_i$ and $g_j$, and the MA polarities $pol_i$ and $pol_j$ (block 63).

Then, if heads Hi and Hj are other than head H0 (i≠0, j≠0), the servo controller 23 calculates the inter-head offset $\Delta_{ij}(t_b)$ of head Hj from head Hi caused at time $t_b$, based on $\Delta_{0i}(t_b)$ and $\Delta_{0j}(t_b)$ saved in the FROM 241 (block 64). Here, the servo controller 23 calculates the inter-head offset $\Delta_{ij}(t_b)$ in accordance with:

$$\Delta_{ij}(t_b) = x_j(t_b) - x_i(t_b) \quad (12)$$
$$= (x_j(t_b) - x_0(t_b)) - (x_i(t_b) - x_0(t_b))$$
$$= \Delta_{0j}(t_b) - \Delta_{0i}(t_b)$$

In contrast, if head Hi is head H0 (i=0), the servo controller 23 uses the inter-head offset $\Delta_{0j}(t_b)$ saved in the FROM 241 as the inter-head offset $\Delta_{ij}(t_b)$. Furthermore, if head Hj is head H0 (j=0), the servo controller 23 uses $-\Delta_{0j}(t_b)$ obtained by reversing the sign of the inter-head offset $\Delta_{0j}(t_b)$ saved in the FROM 241, as the inter-head offset $\Delta_{ij}(t_b)$. This is because $\Delta_{j0}(t_b)$ is expressed by $x_0(t_b) - x_j(t_b) = -(x_j(t_b) - x_0(t_b)) = -\Delta_{0j}(t_b)$.

Then, the servo controller 23 corrects the inter-head offset $\Delta_{ij}(t_b)$ based on the correction values $pol_i \times d_{Mi}(t_c) = pol_i \times g_i \times V_i(t_c)$ and $pol_j \times d_{Mj}(t_c) = pol_j \times g_j \times V_j(t_c)$ calculated in block 63 (block 65). Here, the servo controller 23 corrects the inter-head offset $\Delta_{ij}(t_b)$ to the value expressed by:

$$\Delta_{ij}(t_b) + pol_j \times g_j \times V_j(t_c) - pol_i \times g_i \times V_i(t_c) \quad (13)$$

The corrected $\Delta_{ij}(t_b)$ ($=\Delta_{ij}(t_b) + pol_j \times g_j \times V_j(t_c) - pol_i \times g_i \times V_i(t_c)$) is an inter-head offset $\Delta_{cij}(t_c)$ determined with the displacements of microactuators MAi and MAj taken into account and is indicative of the inter-head offset $\Delta_{cij}(t_c)$ of head Hj from head Hi at time $t_c$ (that is, the time of head switching). Thus, the servo controller 23 sets the corrected $\Delta_{ij}(t_b)$ as the inter-head offset $\Delta_{cij}(t_c)$ (block 66).

Then, the servo controller 23 calculates (more specifically, computationally estimates) the position $x_{Mj}(t_c)$ of head Hj positioned at time $t_c$, based on the position $x_{Mi}(t_c)$ of head Hi detected in block 61 and the inter-head offset $\Delta_{cij}(t_c)$ set in block 66 (block 67). That is, the servo controller 23 calculates the position $x_{Mj}(t_c)$ of head Hj in accordance with:

$$x_{Mj}(t_c) = x_{Mi}(t_c) + \Delta_{cij}(t_c) \quad (14)$$
$$= (x_{Mi}(t_c) - pol_i \times g_i \times V_i(t_c)) +$$
$$\Delta_{ij}(t_b) + pol_j \times g_j \times V_j(t_c)$$

The inter-head offset $\Delta_{cij}(t_c)$ used to calculate the position $x_{Mj}(t_c)$ of head Hj is determined with the displacements of microactuators MAi and MAj taken into account and is the inter-head offset of head Hj from head Hi at the time $t_c$ of head switching. Thus, the use of the inter-head offset $\Delta_{cij}(t_c)$ allows the accurate calculation (estimation) of the position $x_{Mj}(t_c)$ of head Hj positioned in a state where microactuators MAi and MAj are in operation. This enables a reduction in a variation in the seek time required for a seek operation involving head switching or allows the seek time to be shortened.

Now, a case will be described in which instead of $\Delta_{ij}(t_b)$, $\Delta_{ij}(t_a)$ and $d\Delta_{ij}(t_b)$ are saved in the FROM 241. $d\Delta_{ij}(t_b)$ is the difference between $\Delta_{ij}(t_b)$ measured at time tb and the inter-head offset $\Delta_{ij}(t_a)$ measured in the first case at time $t_a$ ($t_a < t_b$). $d\Delta_{ij}(t_b)$ is expressed by:

$$d\Delta_{ij}(t_b) = \Delta_{ij}(t_b) - \Delta_{ij}(t_a) \quad (15)$$

As is obvious, $\Delta_{ij}(t_b)$ is expressed by $\Delta_{ij}(t_a) + d\Delta_{ij}(t_b)$. Thus, the servo controller 23 calculates the inter-head offset $\Delta_{cij}(t_c)$ (that is, the corrected $\Delta_{ij}(t_b)$) in accordance with:

$$\Delta_{cij}(t_c) = \Delta_{ij}(t_b) + pol_j \times g_j \times V_j(t_c) - pol_i \times g_i \times V_i(t_c) \quad (16)$$
$$= \Delta_{ij}(t_a) + d\Delta_{ij}(t_b) + pol_j \times g_j \times V_j(t_c) -$$
$$pol_i \times g_i \times V_i(t_c)$$

In this case, the servo controller 23 may calculate the position $x_{Mj}(t_c)$ of head Hj based on the inter-head offset $\Delta_{cij}(t_c)$ and the position $x_{Mi}(t_c)$ of head Hi, in accordance with:

$$x_{Mj}(t_c) = x_{Mi}(t_c) + \Delta_{cij}(t_c) \quad (17)$$
$$= (x_{Mi}(t_c) - pol_i \times g_i \times V_i(t_c)) +$$
$$\Delta_{ij}(t_a) + d\Delta_{ij}(t_b) + pol_j \times g_j \times V_j(t_c)$$

<First Modification>

Now, a first modification of the embodiment will be described.

Figure 7:
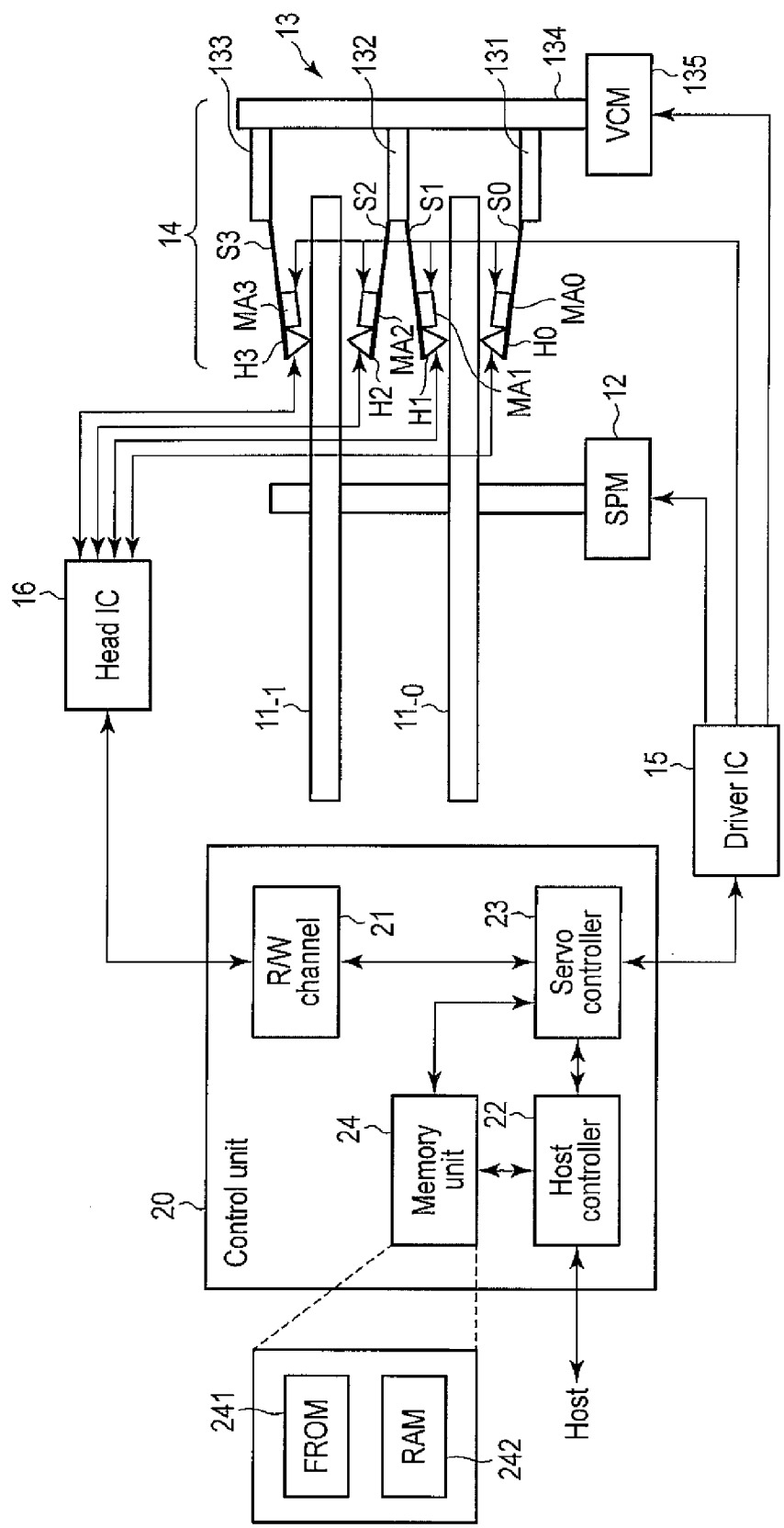
FIG. 7 is a block diagram showing an exemplary configuration of a magnetic disk drive according to a first modification of the embodiment.

FIG. 7 is a block diagram showing an exemplary configuration of a magnetic disk drive according to the first modification. The first modification is different from the embodiment in that the method 2 is applied to the first modification. Here, it is assumed that heads H0 and H2 are classified as a group A and that heads H1 and H3 are classified as a group B. Furthermore, it is assumed that microactuators MA0 and MA2 corresponding to heads H0 and H2 in the group A are set to a polarity of 1 (that is, a positive polarity) and that microactuators MA1 and MA3 corresponding to heads H1 and H3 in the group B are set to a polarity of −1 (that is, a negative polarity). It is further assumed that the driver IC 15 applies the same voltage to all microactuators MA0 to MA3.

First, an exemplary procedure for the process of correcting the inter-head offset will be described with reference to the flowchart in FIG. 5. As is the case with the embodiment, the servo controller 23 measures the inter-head offset $\Delta_{0i}(t_b)$ or $\Delta_{M0i}(t_b)$ for all values of i (i=1, 2, 3) (block 51).

Upon measuring $\Delta_{M0i}(t_b)$, the servo controller 23 calculates the correction values $pol_i \times d_{Mi}(t_b) = pol_i \times g_i \times V(t_b)$ and $pol_0 \times d_{M0}(t_b) = pol_0 \times g_0 \times V(t_b)$ based on the MA voltage $V(t_b)$, the MA gains $g_i$ and $g_0$, and the MA polarities $pol_i$ and $pol_0$ (block 52). This processing is equivalent to replacement of the MA voltages $V_i(t_b)$ and $V_i(t_b)$ with $V(t_b)$ in block 52 of the embodiment. The MA voltage $V(t_b)$ is common to heads Hi and H0. The MA gains $g_i$ and $g_0$ and the MA polarities $pol_i$ and $pol_0$ correspond to heads Hi and H0, respectively.

Then, the servo controller 23 corrects the inter-head offset $\Delta_{M0i}(t_b)$ to the inter-head offset $x_i(t_b)-x_0(t_b)$ in the first state as is the case with the embodiment, based on the correction values $pol_i \times d_{Mi}(t_b)=pol_i \times g_i \times V(t_b)$ and $pol_0 \times d_{M0}(t_b)=pol_0 \times g_0 \times V(t_b)$ calculated in block 52 (block 53). The servo controller 23 sets the corrected $\Delta_{M0i}(t_b)$ $(=x_i(t_b)-x_0(t_b))$ as the inter-head offset $\Delta_{0i}(t_b)$ in the first state (block 54).

Then, the servo controller 23 saves the inter-head offset $\Delta_{0i}(t_b)$ to the FROM 241 (block 55). The inter-head offset $\Delta_{0i}(t_b)$ is free from the effects of displacements of microactuators MA0 and MAi.

Here, it is assumed that the inter-head offset in the first case $\Delta_{0i}(t_a)=x_i(t_a)-x_0(t_a)$ is measured at time $t_a$ preceding time $t_b$ ($t_a<t_b$). In this case, the servo controller 23 may calculate the difference $d\Delta_{0i}(t_b)$ between $\Delta_{0i}(t_b)$ (that is, the corrected inter-head offset $\Delta_{M0i}(t_b)$) and $\Delta_{0i}(t_a)$ in accordance with the above-described Expression (11) as is the case with the embodiment. The servo controller 23 may save both $\Delta_{0i}(t_a)$ and $d\Delta_{0i}(t_b)$ to the FROM 241 instead of $\Delta_{0i}(t_b)$).

Now, the exemplary procedure for the process of estimating the head position utilizing the inter-head offset during head switching will be described with reference to a flowchart in FIG. 6. First, it is assumed head Hi is switched to head Hj ($j \neq i$) at time $t_c$ ($t_c>t_b$). Then, the servo controller 23 functions as a head position detector, and detects the position $x_{Mi}(t_c)$ of head Hi (block 61). Here, i denotes one of 0, 1, 2, and 3 unlike in the case of the process of correcting the inter-head offset.

Then, the servo controller 23 obtains the MA voltage $V(t_c)$, the MA gains $g_i$ and $g_j$, and the MA polarities $pol_i$ and $pol_j$ (block 62). This processing is equivalent to replacement of the MA voltages $V_i(t_c)$ and $V_j(t_c)$ with $V(t_c)$ in block 62 of the embodiment. The MA voltage $V(t_b)$ is common to heads Hi and Hj. The MA gains $g_i$ and $g_j$ and the MA polarities $pol_i$ and $pol_j$ correspond to heads Hi and Hj, respectively.

Then, the servo controller 23 calculates the correction values $pol_i \times d_{Mi}(t_c)=pol_i \times g_i \times V(t_c)$ and $pol_j \times d_{Mj}(t_c)=pol_j \times g_j \times V(t_c)$ for the displacements $d_{Mi}(t_c)$ and $d_{Mj}(t_c)$ of microactuators MAi and MAj based on the MA voltage $V(t_c)$, the MA gains $g_i$ and $g_j$, and the MA polarities $pol_i$ and $pol_j$ (block 63).

Then, as is the case with the embodiment, the servo controller 23 obtains the inter-head offset $\Delta_{ij}(t_b)$ of head Hj from head Hi caused at time $t_b$ (block 64). The servo controller 23 then corrects the inter-head offset $\Delta_{ij}(t_b)$ to $\Delta_{ij}(t_b)+pol_j \times g_j \times V(t_c)-pol_i \times g_i \times V(t_c)$ based on the correction values calculated in block 63 (block 65).

The corrected $\Delta_{ij}(t_b)$ $(=\Delta_{ij}(t_b)+pol_j \times g_j \times V(t_c)-pol_i \times g_i \times V(t_c))$ is indicative of the inter-head offset $\Delta_{cij}(t_c)$ of head Hj from head Hi at time $t_c$, which is determined with the displacements of microactuators MAi and MAj taken into account. Thus, the servo controller 23 sets the corrected $\Delta_{ij}(t_b)$ as the inter-head offset $\Delta_{cij}(t_c)$ (block 66).

Then, the servo controller 23 calculates the position $x_{Mj}(t_c)$ of head Hj positioned at time $t_c$, based on the position $x_{Mi}(t_c)$ of head Hi and the inter-head offset $\Delta_{cij}(t_c)$ in accordance with the following expression (block 67).

$$x_{Mj}(t_c) = x_{Mi}(t_c) + \Delta_{cij}(t_c) \quad (18)$$
$$= (x_{Mi}(t_c) - pol_i \times g_i \times V(t_c)) +$$
$$\Delta_{ij}(t_b) + pol_j \times g_j \times V(t_c)$$

Like the embodiment, the first modification can accurately calculate (estimate) the position $x_{Mj}(t_c)$ of head Hj positioned in the state where microactuators MAi and MAj are in operation, using the inter-head offset $\Delta_{cij}(t_c)$ determined with the displacements of microactuators MAi and MAj taken into account.

Now, a case will be described in which instead of $\Delta_{ij}(t_b)$, the above-described $\Delta_{ij}(t_a)$ and $d\Delta_{ij}(t_b)$ are saved in the FROM 241. The servo controller 23 calculates the $\Delta_{cij}(t_c)$ (that is, the corrected $\Delta_{ij}(t_b)$) in accordance with:

$$\Delta_{cij}(t_c) = \Delta_{ij}(t_b) + pol_j \times g_j \times V(t_c) - pol_i \times g_i \times V(t_c) \quad (19)$$
$$= \Delta_{ij}(t_a) + d\Delta_{ij}(t_b) + pol_j \times g_j \times V(t_c) -$$
$$pol_i \times g_i \times V(t_c)$$

In this case, the servo controller 23 can calculate the position $x_{Mj}(t_c)$ of head Hj based on the inter-head offset $\Delta_{cij}(t_c)$ and the position $x_{Mi}(t_c)$ of head Hi, in accordance with:

$$x_{Mj}(t_c) = x_{Mi}(t_c) + \Delta_{cij}(t_c) \quad (20)$$
$$= (x_{Mi}(t_c) - pol_i \times g_i \times V(t_c)) +$$
$$\Delta_{ij}(t_a) + d\Delta_{ij}(t_b) + pol_j \times g_j \times V(t_c)$$

<Second Modification>

Now, a second modification of the embodiment will be described with reference to FIG. 7 for convenience. The second modification is different from the first modification in that the method 3 is applied to the second modification. Here, it is assumed that all microactuators MA0 to MA3 are set to the same polarity, for example, a polarity of 1 (pol=1), and that the same voltage is applied to all microactuators MA0 to MA3.

First, the exemplary procedure for the process of correcting the inter-head offset will be described with reference to the flowchart in FIG. 5. As is the case with the embodiment, the servo controller 23 measures the inter-head offset $\Delta_{0i}(t_b)$ or $\Delta_{M0i}(t_b)$ for all values of i (i=1, 2, 3) (block 51).

Upon measuring $\Delta_{M0i}(t_b)$, the servo controller 23 calculates the correction values $pol \times d_{Mi}(t_b)=g_i \times V(t_b)$ and $pol \times d_{M0}(t_b)=g_0 \times V(t_b)$ based on the MA polarity pol (=1), the MA voltage $V(t_b)$, and the MA gains $g_i$ and $g_0$ (block 52). This processing is equivalent to replacement of the MA polarities $pol_i$ and $pol_0$ with pol (=1) and the MA voltages $V_i(t_b)$ and $V_0(t_b)$ with $V(t_b)$ in block 52 of the embodiment. The MA polarity pol (=1) and the MA voltage $V(t_b)$ are both common to heads Hi and H0. The MA gains $g_i$ and $g_0$ correspond to heads Hi and H0, respectively.

Then, the servo controller 23 corrects the inter-head offset $\Delta_{M0i}(t_b)$ to the inter-head offset $x_i(t_b)-x_i(t_b)$ in the first state as is the case with the embodiment, based on the correction values $pol \times d_{Mi}(t_b)=g_i \times V(t_b)$ and $pol \times d_{M0}(t_b)=g_0 \times V(t_b)$ calculated in block 52 (block 53). The servo controller 23 sets the corrected $\Delta_{M0i}(t_b)$ $(=x_i(t_b)-x_i(t_b))$ as the inter-head offset $\Delta_{0i}(t_b)$ in the first state (block 54).

Then, the servo controller 23 saves the inter-head offset $\Delta_{0i}(t_b)$ to the FROM 241 (block 55). The inter-head offset $\Delta_{0i}(t_b)$ is free from the effects of displacements of microactuators MA0 and MAi.

Here, it is assumed that the inter-head offset in the first case $\Delta_{0i}(t_a)=x_i(t_a)-x_0(t_a)$ is measured at time $t_a$ preceding time $t_b$ ($t_a<t_b$). In this case, the servo controller 23 may calculate the difference $d\Delta_{0i}(t_b)$ between $\Delta_{0i}(t_b)$ (that is, the corrected inter-head offset $\Delta_{M0i}(t_b)$) and $\Delta_{0i}(t_a)$ in accordance with the above-described Expression (11) as is the case with the embodiment.

The servo controller 23 may save both $\Delta_{0i}(t_a)$ and $d\Delta_{0i}(t_b)$ to the FROM 241 instead of $\Delta_{0i}(t_b)$.

Now, the exemplary procedure for the process of estimating the head position utilizing the inter-head offset during head switching will be described with reference to the flowchart in FIG. 6. First, it is assumed head Hi is switched to head Hj ($j \neq i$) at time $t_c$ ($t_c > t_b$). Then, the servo controller 23 detects the position $x_i(t_c)$ of head Hi (block 61). Here, i denotes one of 0, 1, 2, and 3 unlike in the case of the process of correcting the inter-head offset.

Then, the servo controller 23 obtains the MA polarity pol (=1), the MA voltage $V(t_c)$, and the MA gains $g_i$ and $g_j$ (block 62). This processing is equivalent to replacement of the MA polarities $pol_i$ and $pol_j$ with pol (=1) and the MA voltages $V_i(t_c)$ and $V_j(t_c)$ with $V(t_c)$ in block 62 of the embodiment. The MA polarity pol (=1) and the MA voltage $V(t_c)$ are both common to heads Hi and Hj. The MA gains $g_i$ and $g_j$ correspond to heads Hi and Hj, respectively.

Then, the servo controller 23 calculates the correction values $pol \times d_{Mi}(t_c) = g_i \times V(t_c)$ and $pol \times d_{Mj}(t_c) = g_j \times V(t_c)$ for the displacements $d_{Mi}(t_c)$ and $d_{Mj}(t_c)$ of microactuators MAi and MAj based on the polarity pol (=1), the MA voltage $V(t_c)$, and the MA gains $g_i$ and $g_j$ (block 63).

Then, as is the case with the embodiment, the servo controller 23 obtains the inter-head offset $\Delta_{ij}(t_b)$ of head Hj from head Hi caused at time $t_b$ (block 64). The servo controller 23 then corrects the inter-head offset $\Delta_{ij}(t_b)$ to $\Delta_{ij}(t_b) + g_j \times V(t_c) - g_i \times V(t_c)$ based on the correction values calculated in block 63 (block 65).

The corrected $\Delta_{ij}(t_b)$ ($= \Delta_{ij}(t_b) + g_j \times V(t_c) - g_i \times V(t_c)$) is indicative of the inter-head offset $\Delta_{cij}(t_c)$ of head Hj from head Hi at time $t_c$, which is determined with the displacements of microactuators MAi and MAj taken into account. Thus, the servo controller 23 sets the corrected $\Delta_{ij}(t_b)$ as the inter-head offset $\Delta_{cij}(t_c)$ (block 66).

Then, the servo controller 23 calculates the position $x_{Mj}(t_c)$ of head Hj positioned at time $t_c$, based on the position $x_{Mi}(t_c)$ of head Hi and the inter-head offset $\Delta_{cij}(t_c)$ in accordance with the following expression (block 67).

$$x_{Mj}(t_c) = x_{Mi}(t_c) + \Delta_{cij}(t_c) \quad (21)$$
$$= (x_{Mi}(t_c) - g_i \times V(t_c)) + \Delta_{ij}(t_b) + g_j \times V(t_c)$$

Like the embodiment, the second modification can accurately calculate (estimate) the position $x_{Mj}(t_c)$ of head Hj positioned in the state where microactuators MAi and MAj are in operation, using the inter-head offset $\Delta_{cij}(t_c)$ determined with the displacements of microactuators MAi and MAj taken into account.

Now, a case will be described in which instead of $\Delta_{ij}(t_b)$, the above-described $\Delta_{ij}(t_a)$ and $d\Delta_{ij}(t_b)$ are saved in the FROM 241. The servo controller 23 calculates the inter-head offset $\Delta_{cij}(t_c)$ (that is, the corrected $\Delta_{ij}(t_b)$) in accordance with:

$$\Delta_{cij}(t_c) = \Delta_{ij}(t_b) + g_j \times V(t_c) - g_i \times V(t_c) \quad (22)$$
$$= \Delta_{ij}(t_a) + d\Delta_{ij}(t_b) + g_j \times V(t_c) - g_i \times V(t_c)$$

In this case, the servo controller 23 can calculate the position $x_{Mj}(t_c)$ of head Hj based on the inter-head offset $\Delta_{cij}(t_c)$ and the position $x_{Mi}(t_c)$ of head Hi, in accordance with:

$$x_{Mj}(t_c) = x_{Mi}(t_c) + \Delta_{cij}(t_c) \quad (23)$$
$$= (x_{Mi}(t_c) - g_i \times V(t_c)) + \Delta_{ij}(t_a) + d\Delta_{ij}(t_b) + g_j \times V(t_c)$$

The above-described at least one embodiment can provide a magnetic disk drive having a dual-stage actuator which can accurately estimate the head position if head switching takes place while the microactuators are in operation, and a method for estimating the head position in the magnetic disk drive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
    a first microactuator configured to move a first head associated with a first disk surface;
    a second microactuator configured to move a second head associated with a second disk surface;
    a voice coil motor actuator configured to move the first head and the second head;
    a storage unit configured to store a first inter-head offset measured in a first state at a first time, the first inter-head offset indicative of a displacement between the first head and the second head in a radial direction of the first disk surface and the second disk surface, the first state comprising a state where the first microactuator and the second microactuator are stationary;
    a head position detector configured to detect a position of the first head when the first head is switched to the second head at a second time after the first time; and
    a head position estimator configured to estimate a position of the second head based on the position of the first head, a first voltage, a first polarity of the first microactuator, a first gain of the first microactuator, a second voltage, a second polarity of the second microactuator, a second gain of the second microactuator, and the first inter-head offset, the first voltage and the second voltage applied to the first microactuator and the second microactuator, respectively, at the second time.

2. The magnetic disk drive of claim 1, wherein the head position estimator is further configured to:
    calculate a first displacement of the first microactuator in the radial direction at the second time based on the first voltage, the first polarity, and the first gain,
    calculate a second displacement of the second microactuator in the radial direction at the second time based on the second voltage, the second polarity, and the second gain, and
    estimate the position of the second head based on the position of the first head, the first displacement, the second displacement, and the first inter-head offset.

3. The magnetic disk drive of claim 1, further comprising an inter-head offset measurement module configured to:
    measure the first inter-head offset in the first state in a first case where the first microactuator and the second microactuator are not moved at the first time, and
    store the first inter-head offset in the storage unit.

4. The magnetic disk drive of claim 3, wherein:
the inter-head offset measurement module is further configured to measure a second inter-head offset in a second state in a second case where the first microactuator and the second microactuator are moved at the first time, the second inter-head offset indicative of a displacement between the first head and the second head in the radial direction at the first time, the second state comprising a state where the first microactuator and the second microactuator are in operation; and
the magnetic disk drive further comprises an inter-head offset correction module configured to:
correct the second inter-head offset to the first inter-head offset based on a third voltage, the first polarity, the first gain, a fourth voltage, the second polarity, and the second gain, the third voltage and the fourth voltage applied to the first microactuator and the second microactuator, respectively, at the first time, and
store the first inter-head offset in the storage unit.

5. The magnetic disk drive of claim 4, wherein the inter-head offset correction module is further configured to:
calculate a third displacement of the first microactuator in the radial direction at the first time based on the third voltage, the first polarity, and the first gain,
calculate a fourth displacement of the second microactuator in the radial direction at the first time based on the fourth voltage, the second polarity, and the second gain, and
correct the second inter-head offset to the first inter-head offset based on the third displacement and the fourth displacement.

6. The magnetic disk drive of claim 4, wherein the first voltage is equal to the second voltage, and the third voltage is equal to the fourth voltage.

7. The magnetic disk drive of claim 1, wherein the first voltage is equal to the second voltage.

8. A head position estimation method for a magnetic disk drive, the head position estimation method comprising;
detecting a position of a first head when the first head is switched to a second head at a second time after a first time; and
estimating a position of the second head based on the position of the first head, a first voltage, a first polarity of a first microactuator, a first gain of the first microactuator, a second voltage, a second polarity of a second microactuator, a second gain of the second microactuator, and a first inter-head offset, the first voltage and the second voltage applied to the first microactuator and the second microactuator, respectively, at the second time.

9. The head position estimation method of claim 8, wherein the estimating comprises:
calculating a first displacement of the first microactuator in the radial direction at the second time based on the first voltage, the first polarity, and the first gain,
calculating a second displacement of the second microactuator in the radial direction at the second time based on the second voltage, the second polarity, and the second gain, and
estimating the position of the second head based on the position of the first head, the first displacement, the second displacement, and the first inter-head offset.

10. The head position estimation method of claim 8, further comprising:
measuring the first inter-head offset in the first state in a first case where the first microactuator and the second microactuator are not moved at the first time, and
storing the first inter-head offset in the storage unit.

11. The head position estimation method of claim 10, further comprising:
measuring a second inter-head offset in a second state in a second case where the first microactuator and the second microactuator are moved at the first time, the second inter-head offset indicative of a displacement between the first head and the second head in the radial direction at the first time, the second state comprising a state where the first microactuator and the second microactuator are in operation;
correcting the second inter-head offset to the first inter-head offset based on a third voltage, the first polarity, the first gain, a fourth voltage, the second polarity, and the second gain, the third voltage and the fourth voltage applied to the first microactuator and the second microactuator, respectively, at the first time, and
storing the first inter-head offset in the storage unit.

12. The head position estimation method of claim 11, wherein the correcting comprises:
calculating a third displacement of the first microactuator in the radial direction at the first time based on the third voltage, the first polarity, and the first gain,
calculating a fourth displacement of the second microactuator in the radial direction at the first time based on the fourth voltage, the second polarity, and the second gain, and
correcting the second inter-head offset to the first inter-head offset based on the third displacement and the fourth displacement.

13. The head position estimation method of claim 11, wherein the first voltage is equal to the second voltage, and the third voltage is equal to the fourth voltage.

14. The head position estimation method of claim 8, wherein the first voltage is equal to the second voltage.

* * * * *